(12) United States Patent
LeJeune, Jr.

(10) Patent No.: US 11,341,741 B2
(45) Date of Patent: May 24, 2022

(54) ARIAL BASED PAROLEE TRACKING AND PURSUIT

(71) Applicant: Satellite Tracking of People LLC, Houston, TX (US)

(72) Inventor: David W. LeJeune, Jr., Conroe, TX (US)

(73) Assignee: Satellite Tracking of People LLC, Houston, TX (US)

( * ) Notice: Subject to any disclaimer, the term of this patent is extended or adjusted under 35 U.S.C. 154(b) by 85 days.

(21) Appl. No.: 16/450,565

(22) Filed: Jun. 24, 2019

(65) Prior Publication Data

US 2020/0401800 A1 Dec. 24, 2020

(51) Int. Cl.
| | |
|---|---|
| *G01S 19/42* | (2010.01) |
| *G06V 20/10* | (2022.01) |
| *G08B 21/02* | (2006.01) |
| *H04N 5/225* | (2006.01) |
| *G06T 7/20* | (2017.01) |
| *B64C 19/00* | (2006.01) |
| *H04N 5/232* | (2006.01) |

(52) U.S. Cl.
CPC .............. *G06V 20/10* (2022.01); *B64C 19/00* (2013.01); *G06T 7/20* (2013.01); *G08B 21/0208* (2013.01); *G08B 21/0269* (2013.01); *H04N 5/2253* (2013.01); *H04N 5/23299* (2018.08); *B64C 2201/027* (2013.01); *B64C 2201/127* (2013.01); *B64C 2201/145* (2013.01)

(58) Field of Classification Search
None
See application file for complete search history.

(56) References Cited

U.S. PATENT DOCUMENTS

| | | | | |
|---|---|---|---|---|
| 2016/0018822 | A1* | 1/2016 | Nevdahs | G05D 1/0094 |
| | | | | 701/26 |
| 2016/0304198 | A1* | 10/2016 | Jourdan | G05D 1/0088 |
| 2017/0371353 | A1* | 12/2017 | Millinger, III | G01S 5/0263 |
| 2018/0155023 | A1* | 6/2018 | Choi | G08G 5/045 |
| 2020/0051189 | A1* | 2/2020 | Williams | H04W 4/029 |

\* cited by examiner

*Primary Examiner* — Leon Viet Q Nguyen
(74) *Attorney, Agent, or Firm* — Polsinelli PC

(57) ABSTRACT

A method for controlling an unmanned aerial vehicle (UAV) to track a monitored person is provided. The method includes directing the UAV toward a target location the target location being based on past or present location information provided by a personal monitoring device attached to a monitored person, the location information representing the location of the personal monitoring device; assuming with the UAV a surveillance position relative to the target location; and determining that the monitored device is proximate to the target location by receiving signals from the personal monitoring device and/or observing the monitored person through a camera on the UAV.

16 Claims, 7 Drawing Sheets

ARIAL BASED PAROLEE TRACKING AND PURSUIT

FIELD OF THE INVENTION

Various embodiments described herein relate generally to visually tracking a monitored person wearing a tracking device. More particularly, various embodiments herein relate to deploying unmanned aerial vehicles (UAVs) to either locate monitored persons at their current location or anticipated locations.

BACKGROUND

The monitoring of movements of monitored individuals involves a variety of sectors, including parolees and home confinement. The technology has its roots in the home arrest systems of the 1980's, in which a user wearable component—typically a "beacon" anklet that was locked to the monitored individual—would communicate wirelessly with a stationary base unit. The range was limited to a few feet of the radio frequency transmitter and receiver. The base unit included a telephone connection for communicating with the authorities. If the monitored individual left the short range allowed by the equipment, the tag and the base unit would lose contact and the base unit would respond by sending an alert to the authorities. False alarms for minor deviations from the short range and/or an inability to confirm false from actual alarms (if the person was where they were supposed to be when the police arrived to investigate) desensitized the police to such alerts, rendering the technology of limited application to low risk offenders.

A later generation of the technology incorporated GPS and cellular telephone technology in a locked anklet. The device would actively record the location of the monitored individual over time and transmit the data to a central monitoring system (e.g., police or parole monitoring services). The central monitoring system could store and analyze the data for prohibited movements (e.g., a sex offender near a school) or cross reference the movement data with crime incident data to see if the monitored individual was near the crime at the time of the crime. U.S. Pat. Nos. 5,867,103, 6,160,481, 6,218,945, 6,512,456 and 6,703,936, incorporated herein by reference in their entireties, are each exemplary of such a system. The technology is also used to monitor other individual sectors (e.g., patients, children) and objects (e.g., cars, cargo).

The modern monitoring device includes a GPS receiver that determines location, a memory that stores location data over time to define a movement history, and a cellular modem that communicates the movement history to a central location through the cell network; some of these devices can also monitor for the presence or consumption of narcotics. A common implementation is in the criminal justice system as an alternative to incarceration, and monitored individuals (typically parolees) have tamper resistant devices attached to their leg by a band. For ease of discussion embodiments herein are directed to parolees, although the invention is not so limited.

Often a parolee will engage in some violation of their probation which is detected by the monitoring device and/or the central monitoring system and identified for follow up by authorities (typically the police or parole officers). For example, the parolee may enter a restricted zone, be in the company of prohibited persons, consume prohibited substances, and/or be the suspect in a crime. The central monitoring system issues appropriate reports/alerts to supervisory personnel in real time or on a schedule, often depending on the nature of the infraction. Authorities may want to respond in real time, or defer action to a later time.

A limitation on the ability to respond to such reports/alerts is manpower. There simply are not enough officials to respond in real time to investigate every violation. For this reason many violations are assigned a lower priority which are not addressed in real time, e.g., they may be the subject of a monthly parolee visit rather than in the field.

In high priority situations, much like any criminal encounter the authorities may not know the circumstances that they are entering. Also the monitored person may not be proximate to any authorities, which limits response time.

For a variety of reasons, the monitoring device may be either inactive (planned or unplanned) or unreachable (e.g., not in range of a cell tower). In certain deployments, the central monitoring system can deploy trusted relay stations that specifically communicate with the monitoring devices over a short range (e.g., WiFi, Bluetooth). When the monitoring device is proximate to such a relay station, the relay station can record the interaction and report the same to the authorities; the known location of the relay device in combination with the short range detection of the mobile device can act as a location proxy for the location information normally transmitted over the cellular network. Authorities can also patrol with mobile versions of the relay stations and make on site short range proximity checks on monitored persons, although as a practical matter this is not widely used due to the limited number of personnel and corresponding travel time for such lower priority monitoring.

BRIEF DESCRIPTION OF THE DRAWINGS

Various embodiments in accordance with the present disclosure will be described with reference to the drawings, in which.

DETAILED DESCRIPTION

Figure 1:
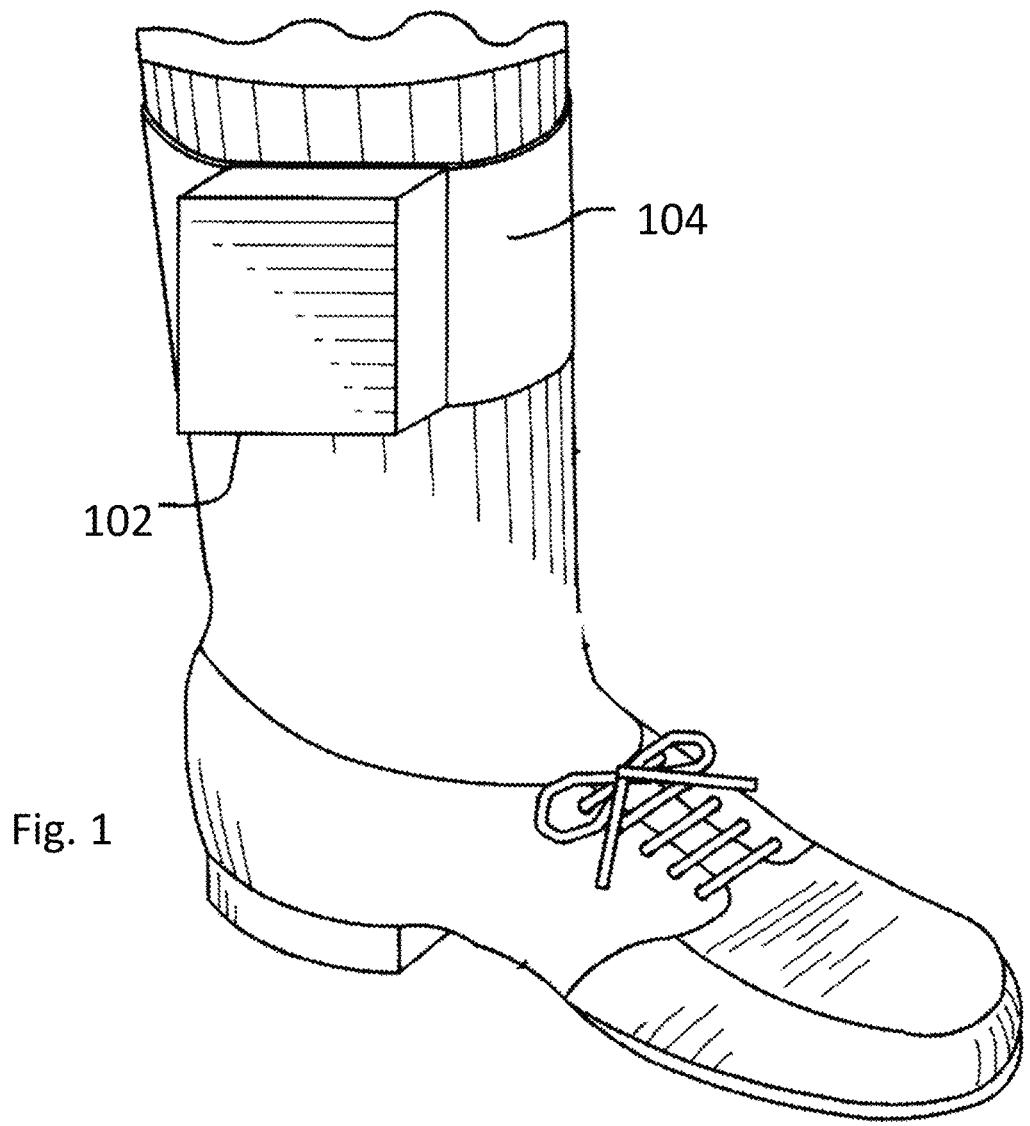
FIG. 1 illustrates an embodiment of a monitoring device attached to an ankle of a user.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation.

The phrase "monitored population" refers to a group of individuals and/or objects that have issued monitoring devices and are subject to common electronic location monitoring by an oversight system. The phrases "monitored individual" and monitored person" refers to a particular individual in the monitored population.

The phrases "unmonitored individual" and "unmonitored person" refers to a particular individual that is not within a particular monitored population. An unmonitored individual may be under no monitoring at all, or may be a monitored individual within a different monitored population. By way of non-limiting example, jurisdictions often run their own monitoring programs based on equipment from competitors that do not share information with each other. Thus California may have an oversight system and corresponding monitored population for California residents, while Texas may have its own oversight system and corresponding monitored population for Texas residents. If the systems are not compatible or otherwise are not sharing data, then they are two different monitored populations. A monitored individual within California's system would thus be a monitored individual within the California monitored population, but an unmonitored individual within Texas' system because Texas is not monitoring that particular individual.

The phrase "general population" refers to people generally, and may include monitored and unmonitored individuals.

An "authorized individual" or "supervising authority" would be any one or more people having some type of supervisory responsibility and/or decision making relative to the monitored population or monitored individual therein. By way of non-limiting example, a parole officer would be the authorized individual relative to a parolee. Other non-limiting examples include parent/child, patient/medical supervisor, etc. Security and/or police could be considered a supervising authority relative to a population of monitored individuals to the extent the emergency level intervention is considered necessary. For sake of brevity, discussion herein is confined to parolee/parole officer relationship, although the invention is not so limited. The invention also applies to objects that can be monitored, such as cars or cargo.

In the concept of devices, a "mobile device" refers to wireless devices with wireless connectively that are designed to be routinely carried by individuals without access to utility power; non-limiting examples include cellular phones, tablets, PDAs and laptops. A common feature of a mobile device is an internal battery that allows for extended periods of use while away from utility electrical power. A "stationary" device refers to devices that are designed to be located for extended periods of time in a single location while operating off of utility power; non-limiting examples include desktop PC's, servers and routers. A common feature of a stationary device is either the lack of an internal battery with corresponding full reliance on utility electrical power, or the presence of a battery (internal or external) for limited backup purposes in the case of loss of utility power. Mobile devices may at times be used as stationary devices (e.g., a laptop may be connected to utility power for an extended period of time and used at a single location), and stationary devices may at times act as mobile devices (in that at least any device can be relocated and at least for a brief period be run off of a backup power), but this does not change their classification as mobile or stationary.

In the concept of technologically determining a geographic position of a person or object, the term "location" refers to the position that the technology identifies the person or object to be, as opposed to the actual physical location of the person or object. Such tracking technologies have some degree of margin of error such that any technologically determined location will not be an exact location of the person or object. For example, under certain conditions GPS has a known margin of error within 1-5 meters, and thus the location determined for a person using GPS under those conditions may differ from their actual position by 1-5 meters. Any such technological determinations of position are thus approximate based on the underlying accuracy of the tracking technology and margin of error. Any use of "location" in the specification or claims is to be considered modified by "approximate" to account for such variation whether expressly stated or not.

"Bracelet gone" is a term of art in the parole tracking art that refers to a condition where the tracking device is not reporting location data as expected. This may be because of the device tampering (e.g., cutting the band, cracking the device casing, jamming the device), device malfunction and/or natural conditions (e.g., a cell dead zone where the device cannot report over its cellular modem) such that the device is either not reporting at all or reporting faulty data.

"Fugitive" refers to a monitored person who has disabled their monitoring device, such as by cutting the band.

"Probe signal" refers to a short range signal (on the order of hundreds of feet in range) emitted by a device with wireless connectivity methodologies that is effective to announce the device's presence and which is detectable by other wireless devices. Such signals may be to propagate the availability of the device and/or to establish a connection with another device. Non-limiting examples of wireless connectivity methodologies that utilize probe signals include Wi-Fi (which emit, e.g., "probe requests" to discover 802.11 networks within its proximity) and Bluetooth via its discovery mode (which emit, e.g., the ID of the device and a request to connect). Probe signals may be emitted by the device spontaneously or in response to outside stimulus. The invention is not limited to any wireless connection methodology, the timing and/or contents of the signal.

Various embodiments herein may relate to leveraging existing services that detect the presence of wireless devices (e.g., smartphones, tablets, hands free, laptops) and store that data for future use. These databases can be cross referenced with prior location data from the tracking device to see what wireless devices were proximate to the tracking device at particular times. For example, a wireless device which is consistently proximate to the tracking device may be the monitored person's own phone. The service can then be used to identify a location for that wireless device so that authorities can be dispatched to that location.

Tracking Devices

FIG. 1 shows a block diagram of a personal monitoring device 102 according to an embodiment of the invention. Personal monitoring device 102 can determine its location, such as through the Global Positioning Satellite, cell towers, LORAN, wireless local access points, or other known methodologies; for sake of brevity discussion herein is confined to GPS, although the invention is not so limited. Monitoring device 102 is shown as a one-piece unit, although multiple pieces as known in the art could also be used.

A band 104 secures monitoring device 102 to a limb of the user, typically the ankle, via a locking mechanism that preferably can only be (legally) opened by an authorized individual. An ankle is shown in FIG. 1, although the invention is not limited thereto. Monitoring device 102 and band 104 preferably have tamper detection capabilities as is known in the art and not discussed further herein. The invention is not limited to any particular securing and/or tamper detection methodology.

Figure 2:
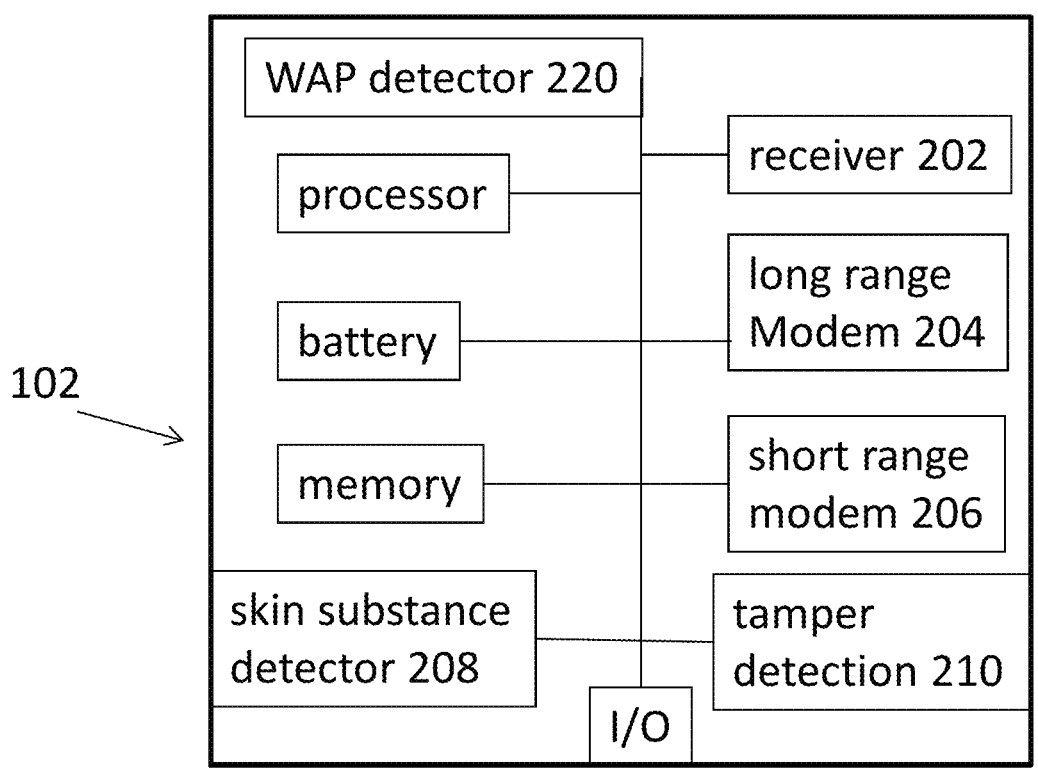
FIG. 2 illustrates an embodiment of the internal components of the monitoring device of FIG. 1.
Figure 3:
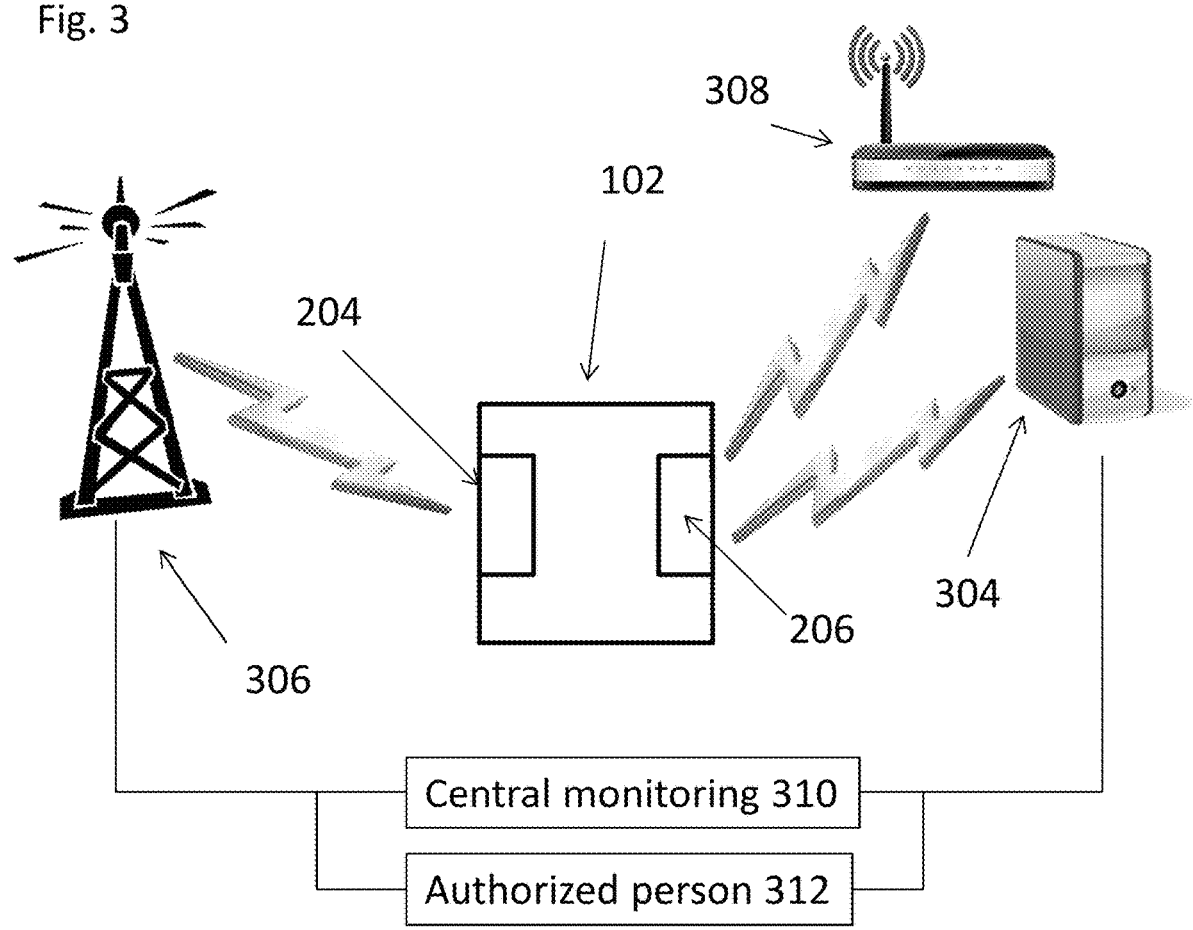
FIG. 3 illustrates an operating environment of the monitoring device of FIG. 1.

Referring now to FIG. 2, a non-limiting example of monitoring device 102 includes a dedicated circuit with hardware and/or software for determining its location, such as a GPS receiver 202. A cellular/long range modem 204 preferably provided with a SIM card allows the monitoring device 102 to communicate through the cellular network with a central monitoring system 310 (FIG. 3). A short range modem 206 (e.g., 915 MHz or 802.11 compatible Wi-Fi or Bluetooth) allows the monitoring device 102 to communicate locally with other wireless devices within the short range as is known in the art for such devices. Modems 204 and 206 may be the same modem operable to communicate on different frequencies. A substance detector 208 may be provided to monitor the presence of prohibited substances in the monitored individual, such as through a sensor in contact with the skin; the configuration of substance detectors within a portable monitored device are known by those of skill in the art and not further discussed herein. Tamper detection mechanism 210 monitors for tamper detection as is known in the art.

Monitoring device 102 may also include a wireless access point detector 220 that detects short range (e.g., maximum range on order of less than hundreds of feet) wireless access points (or "WAP") within range and records information about the detected wireless access points in the memory. By way of non-limiting example, wireless access points may be IEEE 802.11 compatible Wi-Fi hotspots that provide Internet access to network devices as are commonly known in the art of mobile phones and tablets, and the wireless access point detector 220 may be an IEEE 802.11 compatible Wi-Fi finder. In another non-limiting example, devices that communicate via Bluetooth could be wireless access points. A cellular tower is a long range point of access (maximum range on the order of miles) and would not be a short range wireless access point as understood herein.

Batteries, a power port, memory, I/O interface, wired communication access and other supporting computer hardware and software as is known in the art are also preferably provided and not discussed further herein. Monitoring device 102 may be integrated into a single unit or multiple units as is known in the art. The invention is not limited to the details of the architecture of monitoring device 102.

The discussion herein primarily focuses on GPS signals and equipment for location purposes, although the invention is not so limited and other forms of location can be used. Non-limiting examples include GLONASS, Galileo, and GAGAN. Combinations of different location methodologies could also be used. The invention is not limited to the type of location methodology.

The discussion herein primarily focuses on Wi-Fi or Bluetooth signals and equipment for short range communications, although the invention is not so limited and other forms of short range communication can be used. Non-limiting examples include LiFi, ZigBee, and induction wireless. Combinations of different short range methodologies could also be used. The invention is not limited to the type of short range communications.

The discussion herein primarily focuses on cellular and equipment for long range communications, although the invention is not so limited and other forms of long range communication can be used. A non-limiting example is LoRa. Combinations of different location methodologies could also be used. The invention is not limited to the type of long range communications.

Referring now to FIG. 3, monitoring device 102 is shown in an operating environment. Multiple satellites 302 provide the GPS timestamps that GPS receiver 202 in monitoring device 102 converts into location information. The location information represents the approximate position of the monitoring device 102, and by extension the approximate position for the monitored individual, at a particular time. Monitoring device 102 can transmit that information as location data in near real time, and/or can store the location information as location data in memory and batch transfer collected location data as dictated by the need of the system (e.g., on a fixed and/or random schedule, or in response to an event or specific instruction to do so). If substance detection capability is present, then information relating to screening(s) may be similarly stored, transmitted in near real time or batch transmitted collectively, either with or separately from the location data.

Monitoring device 102 preferably has at least two options for remote communications, including data transfer. The first is through the short range modem 206 with a trusted home monitoring device 304 when within the range (e.g., <300 feet, more particularly about 50-100 feet) of the short range modem 206. The second is through the cellular/long range modem 204 (potentially miles) to a cell tower 306 when the monitoring device is out of range of the trusted home monitoring device 304. A third option is short range modem 206 with a wireless access point 308. Preferably cell tower 306, wireless access point 308 and/or trusted home monitoring device 304 connect to central monitoring system 310 and/or an supervisory authority 312, whether directly or through intervening equipment (e.g. cell network, Internet) as known in the art.

Wireless access point detector 220 is shown in FIG. 2 as separate from modems 204 and 206, but may be part of those modems or other components. By way of non-limiting example, modem 204 could be a cellular modem, modem 206 could be a separate RF modem, and wireless access point detector 220 could be a distinct Wi-Fi modem and/or Wi-Fi finder component. In yet another example, modem 206 is a Wi-Fi network adaptor that includes Wi-Fi finder hardware and/or software, such that the wireless access point detector 220 is part of modem 206. In still yet another example, modem 204 could be a cellular modem, modem 206 could be a separate RF modem, and wireless access point detector 220 could be a distinct Wi-Fi network adaptor. The invention is not limited to the particular organization or components that define the wireless access point detector 220.

Central monitoring system 310 is "central" in the sense that it serves one or more monitoring devices 102. It may be a single location, multiple locations operating independently, or a distributed arrangement. At a most basic level the central monitoring system 310 is no more than a computer (e.g., a server) having a memory, processor, modem, input/output, and other supporting computer hardware and software as is known in the art, although in practice they may be large facilities with distributed computers and human handlers. Functionality attributed herein to central monitoring system 310 is preferably implemented by software programmed onto electronic computer hardware. The invention is not limited to the architecture or layout of the central monitoring system 310.

Aerial Surveillance

Figure 4:
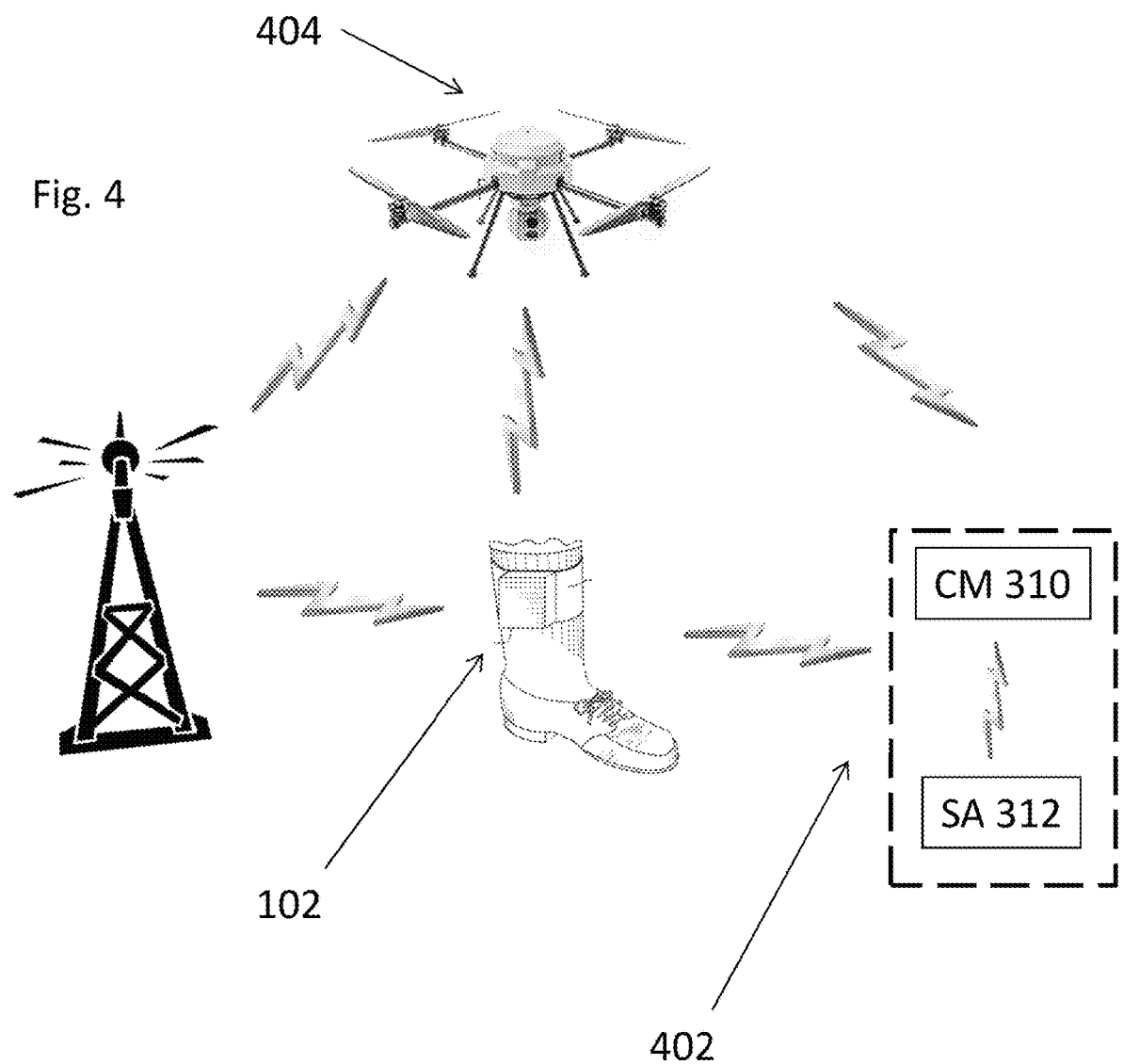
FIG. 4 illustrates a monitoring environment.

Referring now to FIG. 4, monitoring device 102 is shown with the monitoring authority 402 (central monitoring system 310 and/or supervisory authority 312) in concert with a UAV 404. In an embodiment, monitoring device 102 sends location data to the monitoring authority 402, and monitoring authority sends commands to UAV 404 to take specific types of action. The communication pathways as shown in FIG. 4 are direct, but this need not be the case and indeed it is expected that such communications would be indirect through intervening equipment as is known in the art.

UAV 404 includes components as are known in the art, and may include at least a memory, instructions stored in memory, a processor, modem(s), remote control communication, and/or GPS chip to determine its location. UAV 404 would also contain programming as executable by its computer elements to receive a GPS location and travel to that location. UAV 404 may also be equipped with sensors to detect and avoid obstructions such as buildings and trees. The foregoing UAV components are known to those of skill it the UAV art and not further discussed herein. UAV 404 is not limited to any particular type or style of UAV.

Figure 5:
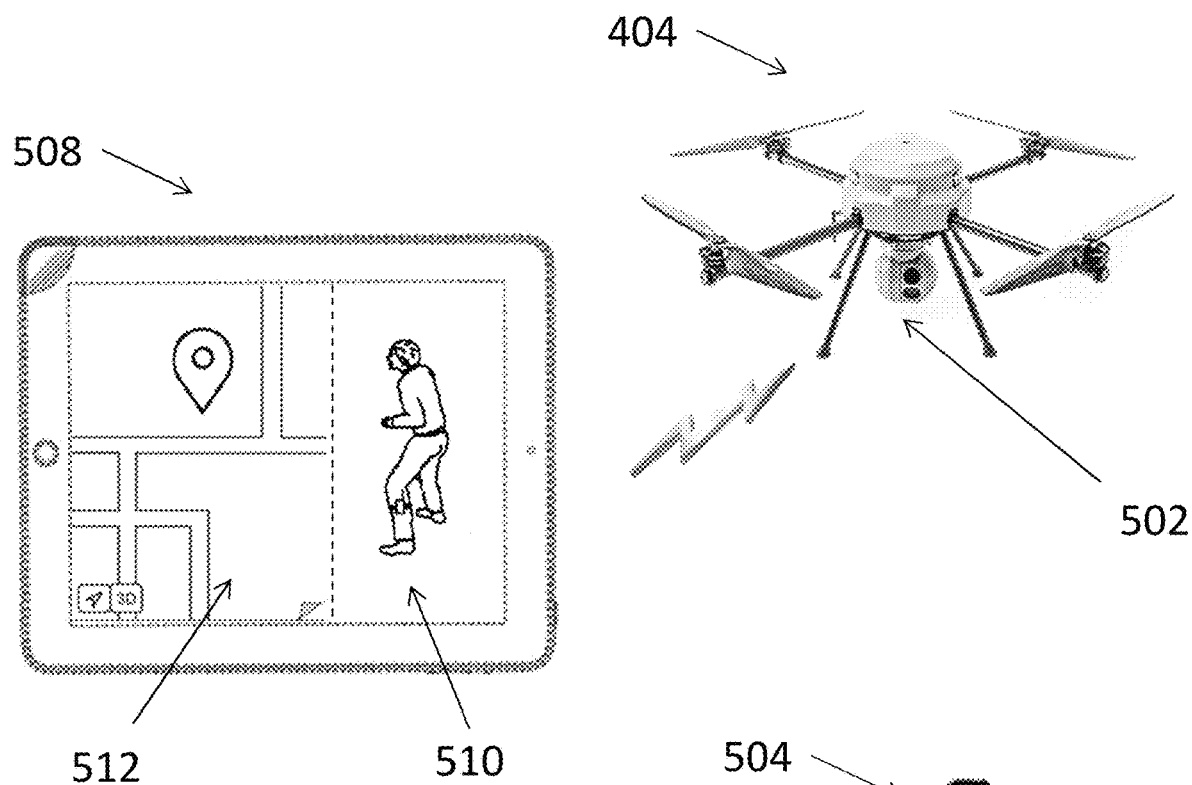
FIG. 5 illustrates observation of a monitored person.
Figure 5:
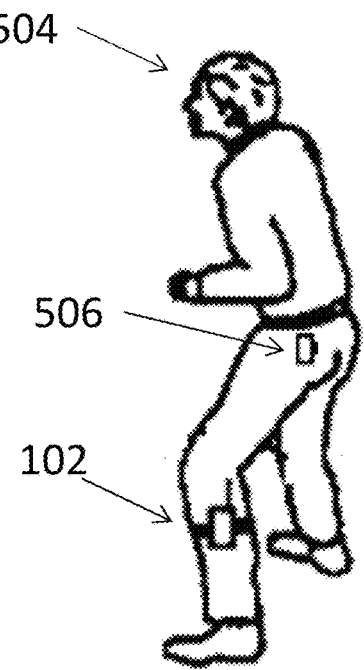

Referring now to FIG. 5, UAV 404 may be equipped with a camera 502 with an adjustable orientation and provide video feedback to the monitoring authority 402 of a monitored person 504 wearing a monitoring device 102. Monitoring authority 402 can receive the video on a display 508 (shown as a tablet, although any display may be used), which can display both the video feed in a display area 510 and a map of the monitored area with a pin to the monitor person 504 in a display area 512.

According to an embodiment UAV 404 may have a surveillance and tracking mode, in which monitoring authority 402 instructs UAV 404 to take a surveillance position relative to the current location of the monitored person. By way of non-limiting example, the monitoring authority may instruct the UAV 404 to take a surveillance position proximate to the most recent GPS location sent by the monitoring device 102 of the monitored person 504. As the monitored person 504 moves and the monitoring device 102 issues new GPS location data, the monitoring authority 402 can feed in near real time the new GPS location to UAV 404; UAV 404 adjust its surveillance position accordingly In this context, a surveillance position may be determined by UAV 404, monitoring authority 402, or a combination of the two; for purpose of brevity the below discussion focuses on UAV 404 making the determinations, but it is to be understood that the invention is not so limited.

For example, if a goal is to maintain aerial surveillance, moving UAV 404 to the specific GPS location of the monitored person may not be appropriate as those coordinates are at ground level. Thus UAV 404 may be preprogrammed with specific rules on how to assume a surveillance position in height and offset distance, if any, relative to a received GPS location. By way of non-limiting example, such a rule could be to maintain a height of 100 feet above and 20 feet laterally away from the GPS position. The rules may be ranges such as the UAV may not fly below 50 feet or above 150 feet. UAV 404 may also be programmed to deviate or adjust from the rules to avoid obstacles, such as buildings or trees.

Monitoring authority 402 may also have direct remote control over UAV 404, and change the position of the UAV 404 as desired, provide such rules, or override existing rules, in real time to account for events on the ground.

As discussed above, monitoring device 102 may have both short and long range modems to transmit data at different frequencies, such as WiFi and cellular, respectively. At least initially, UAV 404 would be too far from the monitored person to receive short range signals, and would thus rely upon the long range signals as sent by monitoring device 102 to monitoring authority 402 and then relayed to UAV 404. As the UAV 404 moves within range of the short range modem communications of the monitoring device 102 (directly from the monitoring device 102 and/or from local access points that are detecting probe signals or other communications from monitoring device 102), UAV 404 can rely upon those short range communications in addition to or as an alternative to the long range communications. Such short range signals could be publicly accessible signals (e.g., Bluetooth or WiFi) and/or private signals that are closed to monitoring devices 102 and the monitoring authority 402; in the latter case UAV 404 would have specific closed architecture, such as a portable version of trusted home monitoring device 304.

By way of non-limiting example, as is known in the art short range communications can be used in combination with GPS signals to more accurately identify a position than GPS alone; UAV 404 could include data from the short range signals to assume a different surveillance position than would be dictated by GPS alone. The programming to utilize short range signals to complement GPS data for more accurate location information is known in the art and not further discussed herein.

As noted above UAV 404 may be equipped with a camera 502 and provide video feedback to monitoring authority 402. UAV 404 may also be programmed to change its surveillance position based on observations of the camera. By way of non-limiting example, if the programming places UAV 404 in a surveillance position for which the camera view is blocked by an object such as a tree, UAV 404 could readjust its position until the object was no longer impeding the view as shown in the camera output. The programming for UAV 404 to analyze camera or other data and make such adjustments is known in the art and not further discussed herein.

The above methodology may lose its effectiveness if there is "bracelet gone" situation in which GPS data from monitoring device 102 is no longer accurate or available (e.g., the monitoring device 102 breaks and is not transmitting, or is cut off such that its location no longer represents the location of the monitored person 504). The methodology can therefore discontinue tracking and surveillance based on the GPS location of the monitoring device 102 and transition to tracking and surveillance of any mobile device 506 (e.g., cell phone) that the monitored person may be carrying.

Specifically, as an alternative/supplemental form of tracking, UAV 404 when in range of monitored person 504 can attempt to track or pair with any mobile device 506 that the monitored person may be carrying. Mobile devices are typically in a default state in which they are emitting probe signals to pair with local access points or other mobile devices. UAV 404 can be equipped with and programmed to monitor for those probe signals and/or pair with mobile device 506 of monitored person 504. In additional and/or the alternative, monitoring authority 402 can identify and track mobile device 506 using the methodologies set forth in U.S. patent application Ser. No. 15/967,804 entitled SYSTEM AND METHOD OF ALTERNATIVE TRACKING UPON DISABLING OF MONITORING DEVICE filed May 1, 2018 and Ser. No. 16/244,770 SYSTEM AND METHOD OF ALTERNATIVE TRACKING UPON DISABLING OF MONITORING DEVICE filed Jan. 10, 2019, both of which are incorporated by reference herein in their entireties, which discloses a method for identifying and tracking mobile devices of monitored persons when monitoring device 102 is disabled.

There are a variety of methodologies by which UAV 404 can identify a mobile device of monitored person for tracking. One way is that the mobile device may be preregistered with monitoring authority 402 as a condition of parole, such that UAV 404 can recognize the mobile device by its ID codes (e.g., MAC address). Another methodology is for UAV 404 to pair with available mobile devices in the area, and then monitoring authority 402 and/or UAV 404 can compare movement of those mobile devices against movement data for monitoring device 102 to identify a match in movement patterns. Yet another methodology is to periodically identify probe signals in the area of mobile device to identify any that are consistently present; a monitored person's mobile device would typically always be present, whereas probe signals that are only present some of the time are likely from mobile devices belonging to someone else. The aforementioned U.S. patent application Ser. Nos. 15/967,804 and 16/244,770 provide other methodologies for identifying a mobile device of the monitored person. The invention is not limited to how monitoring authority 402 and/or UAV 404 identifies and/or tracks mobile device of monitored person 504.

Figure 6:
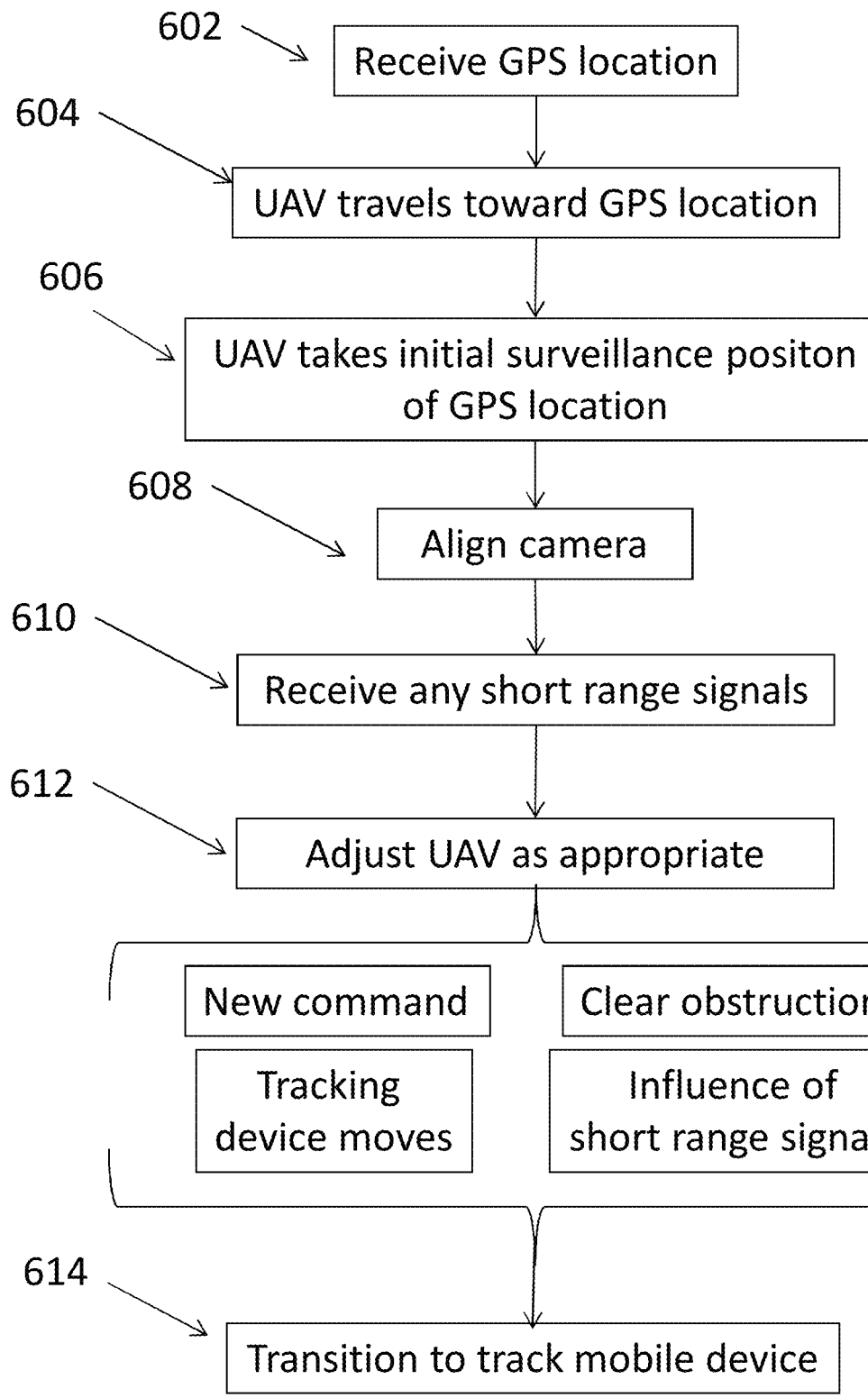
FIG. 6 is a flowchart of an embodiment of the invention.

Referring now to FIG. 6, a flowchart is shown for executing the above methodologies in connection with active aerial surveillance of a monitored person. It is to be understood that not all steps need be executed as any particular implementation may not rely on every feature (e.g., a system without short range signal capability would not rely upon those steps). Also the order of steps is exemplary only, and the steps may be performed in any order, including in parallel, that effectuates the tracking and/or surveillance features as discussed herein.

At block 602, UAV 404 receives a target location from monitoring authority 402. This target location may be a GPS location provided by monitoring device 102 and thus may represent the present (most current reported location) of the monitoring device, or some other GPS location in the movement history of the monitored person. However, the invention is not so limited, and other target locations could be provided as may be determined by monitoring authority 402. By way of example, the target location could be a place that monitoring authority 402 determines that monitored person 504 may be heading towards. The invention is not limited to what the target location represents or where it originated from.

At block 604, UAV 404 travels toward the target location; during this time the target location may remain the same or updated (e.g., as the monitored person moves), for which in the latter case UAV 404 may adjust its trajectory as appropriate.

At block 606, UAV 404 reaches the general vicinity of the target location and assumes a surveillance position as dictated by the target location along with any surveillance rules, impediment avoidance adjustments, and/or remote control by monitoring authority 402. It is to be understood that the surveillance position may never in fact be reached, for example if the monitored person was travelling in a car the UAV could be in constant motion, such that block 606 may not occur.

At block 608, UAV 404 turns its camera on the monitored person 504 based on the target location and any other available data (e.g. short range communication data), and provides video feedback to monitoring authority 402. As noted above, block 608 is shown after blocks 602-606, although the invention is not limited and this block may execute at any time. Block 608 may be contingent on UAV 404 having a camera.

At block 610, UAV 404 may receive short range signals from monitoring device 102 and/or a mobile device 506 that they carry, which as discussed above may be useful for a variety of purposes. UAV 404 and/or monitoring authority may track signals from mobile devices 506, and UAV 404 may pair with a particular mobile device 506; this allows for a determination that the monitored person and monitoring device 102 is proximate to the target location. As noted above, block 610 is shown after blocks 602-608, although the invention is not limited and this block may execute at any time once UAV 404 comes within range of such short range signals. Block 610 in whole or in part may be contingent on UAV 404 having the ability to receive the appropriate short range signals.

At block 612, UAV can adjust its status (e.g., location, camera angles, etc.) in near real time as it receives new information. The nature of the information may take a variety of forms, and the corresponding adjustments may occur independently, in parallel or in combination. The processing of new information that results in the adjustment may occur at UAV 404 (reacting on its own) monitoring authority 402 (monitoring authority 402 commands, UAV 404 reacts) or some combination of the two. For ease or discussion only UAV 404 processing is discussed herein, although it is to be understood that the invention is not so limited.

A non-limiting example of new information is an update in target location, which would be expected if the monitored person 504 moved from a current location and reports a new GPS location. The corresponding steps could track blocks 602-606 as described above.

Another non-limiting example of new information is a determination that the camera has an obstructed view of monitoring device 102. UAV 404 may respond at block 614 by changing the surveillance position or the camera orientation to one that reduces or eliminates any obstruction.

Another non-limiting example of new information is the availability of short range signals. As known in the art, location information can be more accurate when GPS is combined with location wireless information, and this can be used to identify the location of monitored person 504 with more precision than GPS location alone. UAV 404 could adjust its position to account for the more accurate location information.

Another non-limiting example is the ability to override commands from the monitoring authority 402. Examples include the monitoring authority wanting a different camera angle or vantage point, or simply a recall of the drone to return to its home base.

Various sources of information may need to be processed simultaneously, and certain information may complement while others conflict. For example, the GPS location could change but the more accurate information from the short range signals may cause a different compensation. Short range signals could be lost during surveillance. A conflict could emerge between maintain camera observation and maintaining access to short range signals. Override commands supersede pre-programmed actions. Camera observation may be given priority if other communications with the monitoring device is lost (e.g., ankle bracelet is cut, or connection is lost). The specific order, omission and compensations would could be predetermined and established in appropriate programming.

UAV 404 may remain in block 612 indefinitely, making adjustments per new information and continuing to track and surveil monitoring device 102. This state would remain until some intervening event, such as being commanded to other duties, needing to return due to battery depletion, or a situation (e.g., bracelet gone) in which accurate tracking information was no longer available At block 616, the methodology transitions from tracking and surveillance of monitoring device 102 and to tracking and surveillance of a mobile device 506 as previously identified as in likely position of the monitored person. Such tracking can be based on a variety of forms. By way on non-limiting example, UAV 404 could simply follow the signals from monitoring device 102 as it moves. In another example, the methodologies of U.S. patent application Ser. Nos. 15/967,804 and 16/244,770 could track the mobile device 506 and provide updated GPS locations to UAV 404 which UAV would pursue as per block 606-612 (the GPS location being based on location of the mobile device 506 rather than the monitoring device 102). The invention is not limited to the manner in which UAV 404 tracks a mobile device 506 in possession of the monitored person 504.

UAV 404 is consuming battery power during the above operations, and may reach a point at which it can no longer maintain those operations. In an embodiment of the invention, the system can be programmed to determine when the UAV 404 will need to return to a charging location, and launch a different UAV 404 before then so it can take over monitoring responsibilities. This handoff may be somewhat independent in that the replacement UVA 404 is given a target location and proceeds with the process of FIG. 6 while the original UVA 404 departs when the replacement UVA takes over. In the alternative, the two UAVs 404 could communicate with each other to share and/or handoff data related to the current task.

The above methodologies are discussed in the context of high priority pursuit. However, the invention is not so limited, and other lower priority deployments could be used. This may be of particular advantage, as often the monitoring authority 402 lacks the manpower and/or resources to monitor low priority concerns, at least in near real time. Use of UAV 404 can reduce the strain on manpower and resources and thus all for greater real time monitoring and addressing low priority issues.

By way of example, according to another embodiment of the invention UAV 404 could be used to determine whether the monitored person is at a particular location. By way of non-limiting example, the monitored person may be expected to be at an Alcoholics Anonymous meeting at a certain location at a certain time, and the monitoring authority 402 wants to confirm that the monitored person is actually present there (as opposed to standing outside, which is a non-compliant location yet which may be close enough within the GPS margin of error to appear as complaint to the monitoring authority 402). Other non-limiting examples include being at work, home, parolee office or other locations as desired. Also such checks may be on pre-programmed schedule, random, user requested, or any combination therefore. The invention is not limited to where, when and/or why a particular check may occur.

To determine whether the monitored person is at a particular location, corresponding GPS coordinates of the target location could be provided to UAV 404 at block 602, and UAV 404 proceeds to that location via blocks 604 and 606. When in range, UAV 404 would attempt to confirm the presence of the monitored person via camera (e.g., facial recognition) and/or short range communication with monitoring device 102 via blocks 608 and 612, including if necessary adjusting its position for the same at block 615.

Once the presence of the monitored person is confirmed, there are a variety of non-limiting options for UAV 404. One such option is that the confirmation itself was the data of interest, and the UAV 404 could be retasked for other purposes. Another option would be to use the short range signals to enhance the accuracy of the GPS location of the monitoring device 102 to obtain a more exact fix on the location of the monitoring device 102, whereupon with the more accurate location can be compared with the expected location to see if the monitored person is actually where they are supposed to be.

If the presence of the monitored person cannot be confirmed, there are a variety of non-limiting options for UAV 404. One such option is that the lack of confirmation itself was the data of interest, and the UAV 404 could be retasked for other purposes. Another option is that UAV 404 could continue for a period of time at the target location, including by adjusting its position. Another option would be for the UAV 404 to attempt to locate signals from portable devices (e.g., cell phones) of the monitored person or there associates as an alternative method of tracking per block 614 in FIG. 6.

Another option would be to transition from a target location of where the monitored person is expected to be to one or more target locations of where the monitored persons are known to frequent. Specifically, through the collection of movement data and other data over time the monitoring authority 402 can identify areas where the monitored person is known to frequent. Monitoring authority 402 can provide those locations at block 602 above, and the UAV could travel to each one and attempt to locate the monitored person as discussed above. The monitoring authority 402 could send the locations one at a time for individual investigation, or as a set of locations for a sequence of investigations. A sequence could be in order of relevance (e.g., a more likely location v. a less likely location), closest available, most optimal path, etc. The invention is not limited to the methodology by which the set of locations is organized or investigated. UAV 404 would then travel to each location and attempt to locate the monitoring device 102 and/or monitored person using the methodologies discussed herein.

Regardless of whether the UAV 404 confirms the presence of the monitored person, another option is that UAV 404 could continue to monitor the monitor person and/or target location for a period of time to observe any changes or collect other information of interest. By way of example, as noted above methodologies exist to identify and track portable devices (e.g., cell phones) of unmonitored persons to see who the monitored person is proximate to; the UAV could detect and provide that same information, as well as use the camera to identify persons in the area who might be carrying those portable devices. In another example, the video from the camera could be used by UAV 404 and/or monitoring authority 402 to see who the monitored person is with, including whether they are with people that are not allowed to contact under the terms of their probation.

According to another embodiment of the invention, instead of directly tracking the monitored person 504, the UAV 404 could be used to surveil potential locations of the monitored person. By way of non-limiting example, if the monitored person was moving in a direction toward a prohibited area such as a school or a bar, then the UAV 404 could be dispatched to that location per blocks 602-606 above as a precautionary measure. By way of another example, based on past movement patterns as evidenced by prior location information from monitoring device 102, the monitoring authority 402 may have a list of locations and/or persons that a fugitive monitored person might be found and UAV 404 could be dispatched to a particular location per blocks 602-606; this may involve a predication on the most likely location based on, e.g., amount of time spend at that location, known associates at that location, and/or other factors.

In this embodiment, the UAV 404 dispatch is precautionary and speculative, and the monitored person may never arrive there, for which UAV 404 would eventually be recalled. However, if the monitored person 504 does approach the area, then UAV 404 may engage in more active surveillance. Approach to an area could be detected by a variety of means, by way of non-limiting example including GPS location from monitoring device 102 coming within a predetermined distance (horizontal or absolute) of UAV 404, detection of short range signals from monitoring device 102 or a mobile device in the monitored person 504's possession, facial recognition on the video feed from camera 502, or a command from monitoring authority 402 (possible responsive to its own determination that monitored device 102 has reached a certain area). UAV 404 could then maintain surveillance as discussed above.

According to another embodiment, UAV 404 could be used to investigate a lost signal from monitoring device 102. The target location provided at block 602 could be the last known GPS location provided by monitoring device 102 or based on such locate known GPS location. Upon reaching the location, UAV 404 could attempt to reacquire monitoring device 102 via short range signals, identify monitored person 504 via the camera feed (e.g., facial recognition) and/or seek out mobile devices 506 that (may) belong to the monitored person 504.

In addition to observing the monitored person, the camera feed of UAV 404 may be for other information of interest in the surrounding area, such as other individuals, cars, terrain, the presence of weapons; the invention is not limited to the nature of information taken from the feed. UAV 404 and/or monitoring authority 402 could also use analysis software to examine the content of the video feed for other purposes, such as by way of non-limiting examples facial recognition, heat signatures, license plate recognition; the invention is not limited to the nature of the use of information taken from the feed. UAV 404 and/or monitoring authority 402 could also tap into available CCTV video feeds for further information and/or processing.

The ability to track a monitored person with UAVs allows more matters to be handled in real time. As an alternative to dispatch of officers, it reduces strain on manpower, increases response time and officer safety. There may be a benefit to outfit low risk offenders with technologies that don't take as much power or battery to track them.

Figure 7:
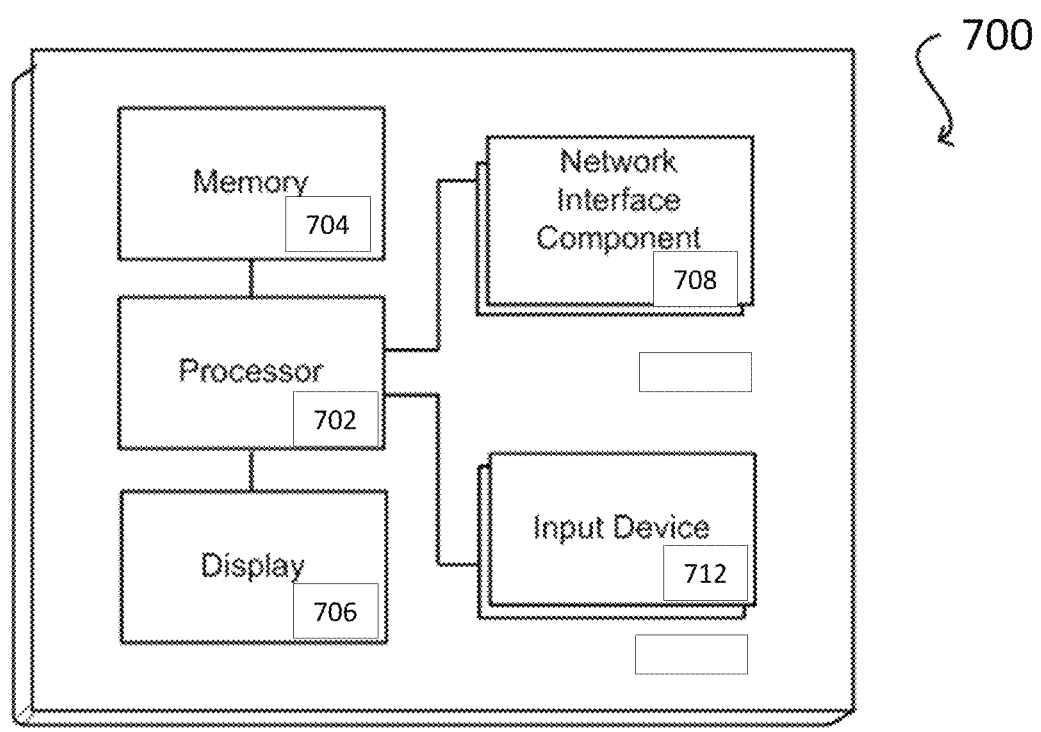
FIG. 7 illustrates a logical arrangement of a set of general components of an example computing device that can be utilized in accordance with various embodiments.

FIG. 7 illustrates a logical arrangement of a set of general components of an example computing device 700 as could be used for the computer elements of any electronics discussed herein, including monitoring device 102, UAV 404, monitoring authority 402, etc. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 712 able to receive conventional input from a user. This conventional input can include, for example, a push button, touch pad, touch screen, keyboard, mouse, keypad, or any other such device or element whereby a user can input a command to the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various embodiments.

The above embodiments refer to location based on GPS coordinates and corresponding equipment to process GPS data. However, the invention is not limited to any particular location methodology, and other methodologies could also be used.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for controlling an unmanned aerial vehicle (UAV) to track a monitored person, comprising:
   directing the UAV toward a target location the target location being based on past or present location information provided by a personal monitoring device locked to a monitored person, the location information representing the location of the personal monitoring device;
   assuming with the UAV a surveillance position relative to the target location;
   determining that the monitored device is proximate to the target location; comprising:
      receiving short range signals from the personal monitoring device; and/or
      observing the monitored person through a camera on the UAV;
   in response to an indication that the location information from the personal monitoring device is no longer available or accurate:
      discontinuing tracking the personal monitoring device; and
      tracking, with the UAV, a mobile device associated with the monitored person, the mobile device being unattached to the monitored person.

2. The method of claim 1, wherein:
   the location information is GPS coordinates sent by the personal monitoring device; and
   the target location is the GPS coordinates sent by the personal monitoring device.

3. The method of claim 1, further comprising adjusting the surveillance position and/or camera orientation.

4. The method of claim 1, wherein the determining is further based on the short range signals.

5. The method of claim 1, wherein the determining is further based on whether any obstruction blocks the camera from observing the monitored person.

6. The method of claim 1, wherein the assuming comprises applying predetermined rules on where to position the UAV relative to a specific location.

7. The method of claim 1, wherein the location information is GPS coordinates determined by a monitoring authority.

8. The method of claim 1, further comprising:
   determining one of: if the monitored person is at the target location, if the monitored person is not at the target location and if the monitored person had lost connection then reconnected with a central monitoring system; and
   issuing an alert in response to a result of the determining.

9. A method for controlling an unmanned aerial vehicle (UAV) with a camera having an adjustable orientation, comprising:
   directing the UAV toward a target location, the target location being based on past or present location information provided by a personal monitoring device attached to a monitored person, the location information representing the location of the personal monitoring device;
   assuming with the UAV a surveillance position relative to the target location;
   aligning the camera of the UAV to observe the monitored person;

determining if an adjustment to the surveillance position and/or camera orientation is needed based on at least a change in the location of the personal monitoring device; and adjusting, in response to the determining, the surveillance position and/or camera orientation;

in response to an indication that the location information from the personal monitoring device is no longer available or accurate:

discontinuing tracking the personal monitoring device; and tracking, with the UAV, a mobile device associated with the monitored person, the mobile device being unattached to the monitored person.

10. The method of claim 9, wherein:

the location information is GPS coordinates sent by the personal monitoring device;

the target location is the GPS coordinates sent by a central monitoring system; and the change in the location of the personal monitoring device determined by updated GPS coordinates sent by the personal monitoring device.

11. The method of claim 9, wherein the adjusting is in response to an override command from a monitoring authority.

12. The method of claim 9, further comprising:

receiving short range signals from the personal monitoring device; and the determining is further based on the short range signals.

13. The method of claim 9, wherein the determining is further based on whether any obstruction blocks the camera from observing the monitored person.

14. The method of claim 9, wherein the assuming comprises applying predetermined rules on where to position the UAV relative to a specific location.

15. The method of claim 9, wherein the location information is GPS coordinates determined by a monitoring authority.

16. The method of claim 9, further comprising:

determining one of: if the monitored person is at the target location, if the monitored person is not at the target location and if the monitored person had lost connection then reconnected with a central monitoring system; and issuing an alert in response to a result of the determining.

* * * * *